H. E. KITTREDGE.
HOSE COUPLING.
APPLICATION FILED JAN. 26, 1909.
966,925.
Patented Aug. 9, 1910.
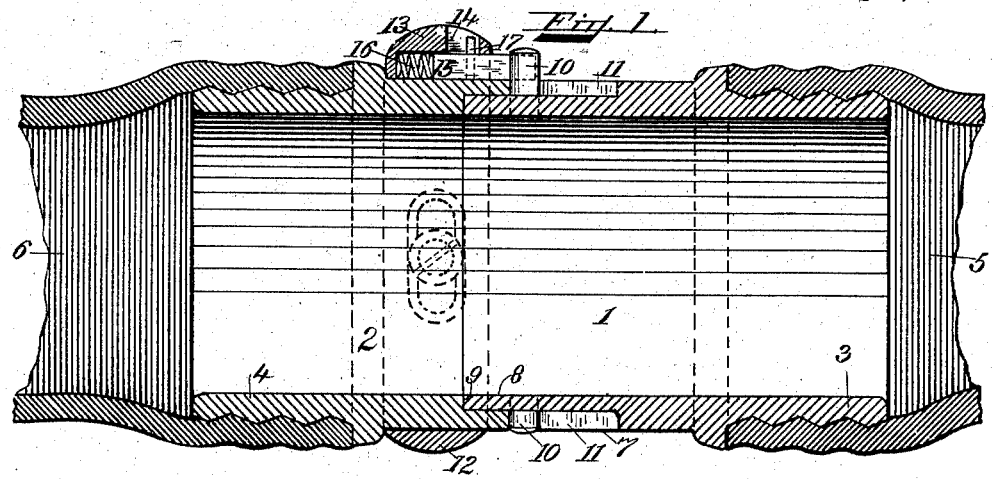
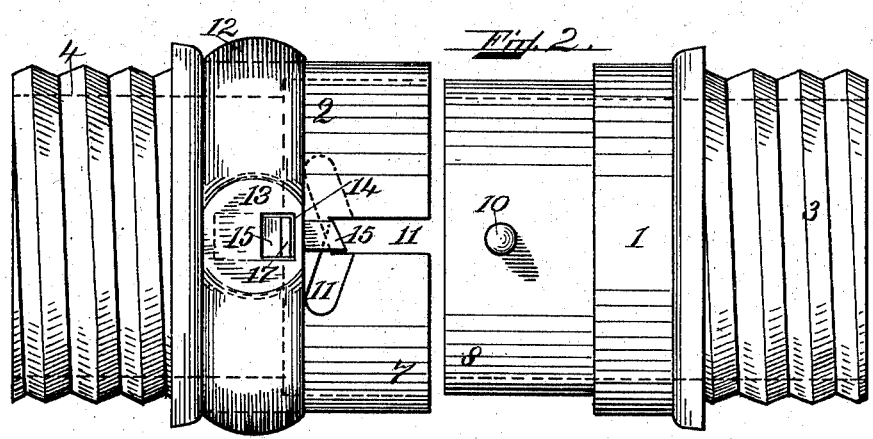
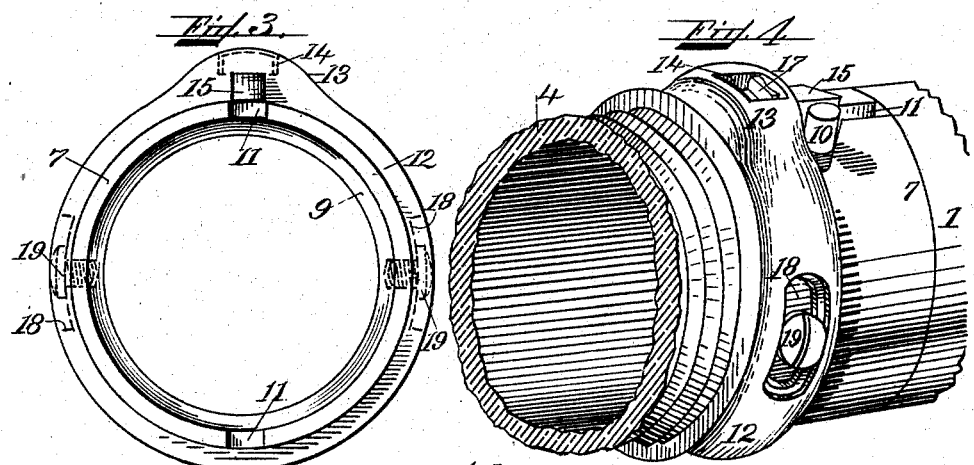
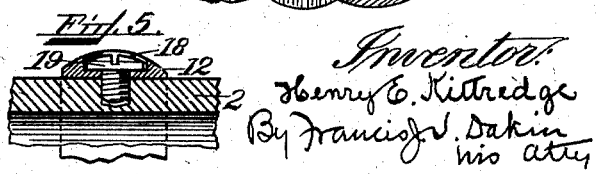

UNITED STATES PATENT OFFICE.

HENRY E. KITTREDGE, OF BOSTON, MASSACHUSETTS.

HOSE-COUPLING.

966,925. Specification of Letters Patent. Patented Aug. 9, 1910.

Application filed January 26, 1909. Serial No. 474,262.

*To all whom it may concern:*

Be it known that I, HENRY E. KITTREDGE, a citizen of the United States, residing at Boston, county of Suffolk, State of Massachusetts, have invented a new and useful Improvement in Hose-Couplings, of which the following is a specification, reference being had therein to the accompanying drawings.

The invention relates to hose couplings and is especially designed for use in coupling fire-hose and hose of similar character which are required to be assembled rapidly and are dragged over the ground and subjected to hard usage.

The object of the invention is to provide a coupling of simple construction which may be rapidly manipulated when being assembled, which is water-tight, which may be locked when in a coupled position and which is not liable to be injured when subjected to hard usage.

The following is a description of the invention, reference being made to the accompanying drawings, in which:—

Figure 1 is a vertical longitudinal sectional view of the coupling assembled; Fig. 2 is a plan view of the coupling separated; Fig. 3 is an end elevation of the female member of the coupling; Fig. 4 is a view in perspective of the coupling assembled; and Fig. 5 is a detail sectional view.

Briefly, the coupling consists of two coöperating members, a male member provided with lugs or projections and a female member provided with bayonet slots corresponding in number and location to the lugs or projections on the male member. When the coupling is assembled the said lugs or projections move in the said bayonet slots. The female member is further provided with an adjustable ring carrying a spring-actuated bolt which engages and locks one of said lugs or projections within its respective bayonet slot when the coupling is assembled and thereby prevents the coupling becoming accidentally uncoupled.

In the drawings illustrating the invention, 1 designates a male member and 2 a female member having their ends 3 and 4 respectively threaded to receive and hold flexible hose 5 and 6. Both members are in the form of hollow cylinders, the member 2 having its ends 7 enlarged to receive a diminished end 8 of the member 1. In order to secure a water-tight joint when the coupling is assembled, the ends 7 and 8 of the two members are accurately fitted to each other and the edge of the end 8 is smoothed to make a close contact with the shoulder 9 on the interior of the female member 2. When the coupling is assembled, the edge of the end 8 by means hereinafter to be explained, is forced into a water-tight contact with the shoulder 9, thereby obviating the use of packing rings. The male member 1 is provided with a plurality of lugs or projections 10, preferably two in number and located on opposite exterior sides of the diminished end 8, one of said lugs being of sufficient height to engage a locking-bar to be hereinafter described. In the end 7 of the female member 2 are a plurality of bayonet slots 11, corresponding in number and location to the lugs 10 on the member 1. The lateral extensions of the bayonet slots 11 are inclined inwardly from the end 7 of the member 2 for the purpose of insuring a tight joint when the coupling is assembled.

For the purpose of locking the members 1 and 2 together when coupled, the following described adjustable means are provided. It is necessary that these means should be adjustable since the frequent coupling and uncoupling of the members 1 and 2 and the consequent grinding of the edge of the end 8 against the shoulder 9 require that the locking means should be moved from time to time to take up the wear and secure a close contact between the members. The female member 2 is therefore provided with a ring 12 having an enlarged portion 13 containing a chamber 14 within which is a locking-bolt 15, actuated by a spring 16. The ring 12 is located contiguous to the bayonet slots 11 and in such relation thereto that the locking-bolt 15 projects over the lateral extension of one of the bayonet slots as shown in Fig. 2. The spring 16 maintains the locking-bolt 15 forward at all times and in a locking position. The locking-bolt 15 is provided with a finger-piece 17 which projects through an opening in the surface of the enlarged portion 13 whereby the locking-bolt 15 may be drawn against the spring 16 and out of locking engagement to permit the coupling to be separated or uncoupled.

In order to secure the ring 12 in any desired position and to permit of adjustment when required, the ring 12 is provided with two longitudinal counter-sunk slots 18 on opposite sides of the female member 2. Screws 19 set in the female member have heads which overlap the counter-sunk portions of the slots 18 and when screwed in bind the said portions of the slots 18 and hold the ring against longitudinal movement.

The operation of the coupling is as follows. The members 1 and 2 are brought together in such a manner that the lugs or projections 10 are opposite the bayonet slots 11. The members are then pushed one into the other, the lugs 10 entering the slots 11 and preventing any relative rotation of the members until the lugs 10 reach the lateral extensions of the slots 11. The male member is then turned laterally and the lugs 10 move into the lateral portions of the slots 11. Owing to the fact that these lateral portions are inclined inwardly, the lugs 10 when moved into said portions by the turning of the male member force the end 8 of that member into close contact with the shoulder 9 on the interior of the member 2 and thereby forms a water-tight joint. In this coupling operation, one of said lugs 10 strikes the beveled end of the locking-bolt 15, moving it rearwardly into the chamber 14 against the spring 16 and as the lug 10 passes into the lateral portion of the slot 11 and out of alinement with the locking-bolt, the latter is released and is forced by the spring 16 forward behind the lug 10 thereby locking it within the lateral portion of the slot. The coupling is then locked and cannot be separated except by moving the locking-bolt 15 out of the path of the lug 10 through the medium of finger-piece 17, turning the male member until the lugs 10 pass into the open portions of the slots 11 and withdrawing the member 1 from the member 2.

It is important that the locking-bolt should be so situated with respect to the particular lug 10 with which it coöperates, that when the member 1 is turned laterally as far as possible to make a tight joint, the locking-bolt should retain the lug in that position and thereby maintain a tight joint between the two members. To accomplish this result it is necessary that the ring 12 be carefully adjusted before the coupling is put into actual use and no further adjustment will be necessary until the edge 8 of the member 1 wears when a new adjustment may be made to take up that wear. In making this adjustment the screws 19 are loosened which permits the ring 12 to be rotated for a short distance on the member 2. The coupling is then assembled and the ring 12 is rotated to bring the locking-bolt 15 in contact with and behind the lug 10. The screws 19 are then set and the adjustment is complete. It is to be noted that the ring 12 is rounded and the coupling presents no angular surfaces which are liable to be caught when the hose is dragged along the ground or over obstacles. It is therefore impossible for the coupling to be unlocked accidentally during use.

What is claimed is:—

1. A hose-coupling having, in combination, a male member having an end provided with lugs, a female member having a shoulder and an extension, the latter having a smooth outer surface and bayonet-slots, an adjustable ring mounted snugly on the extension and abutting said shoulder, and a locking bolt for one of the lugs and locking means for the ring both carried on the ring.

2. A hose-coupling having, in combination, a male member having an end provided with lugs, a female member having a shoulder and an extension, the latter having a smooth outer surface and bayonet-slots, an adjustable ring mounted snugly on the extension and abutting said shoulder and a spring-actuated locking bolt for one of the lugs and means for locking the ring in adjusted position on said female member both carried on the ring.

3. A hose-coupling having, in combination, a male member having an end provided with lugs, a female member having a shoulder and an extension, the latter having a smooth outer surface and bayonet-slots, the lateral portions of which are inclined toward said shoulder, an adjustable ring mounted snugly on the extension and abutting said shoulder and a locking bolt for one of the lugs and locking means for the ring both carried on the ring.

In testimony whereof, I hereunto set my hand, in the presence of two subscribing witnesses, this the fourteenth day of December, 1908.

HENRY E. KITTREDGE.

Witnesses:
LUTHER A. HODGDON,
E. F. NUIAC.